United States Patent [19]

Awakowicz et al.

[11] Patent Number: 4,819,266
[45] Date of Patent: Apr. 4, 1989

[54] TELEPHONE DEVICE WITH MEANS FOR CHANGING THE ANGLE OF INCLINATION

[75] Inventors: Erwin Awakowicz, Munich; Peter Kleine, Fischen, both of Fed. Rep. of Germany

[73] Assignee: Siemens Aktiengesellschaft, Berlin and Munich, Fed. Rep. of Germany

[21] Appl. No.: 7,500

[22] Filed: Jan. 28, 1987

[30] Foreign Application Priority Data

Mar. 12, 1986 [DE] Fed. Rep. of Germany ... 8606851[U]

[51] Int. Cl.⁴ .................... H04M 1/11; A47G 29/00
[52] U.S. Cl. .................................... 379/454; 248/126
[58] Field of Search ............... 379/454, 447, 450, 435, 379/436; 248/126, 302, 175, 652, 653, 1 I, 465.1

[56] References Cited

U.S. PATENT DOCUMENTS

| D. 197,337 | 1/1964 | Zimmuman | D14/57 |
| D. 279,289 | 6/1985 | Bhat et al. | D14/60 |
| 651,129 | 6/1900 | Becker | 248/126 |
| 2,576,883 | 11/1951 | Koski | 248/126 |
| 2,878,324 | 3/1959 | Guerrero | 379/454 |
| 3,859,476 | 1/1975 | Morrell | 379/435 |
| 4,515,998 | 5/1985 | Pinede et al. | 379/435 |
| 4,568,801 | 2/1986 | Gates | 379/435 |

FOREIGN PATENT DOCUMENTS

| 550112 | 12/1959 | Belgium | 370/454 |
| 739887 | 10/1943 | Fed. Rep. of Germany | 379/454 |
| 3140689 | 4/1983 | Fed. Rep. of Germany | . |

Primary Examiner—Jin F. Ng
Assistant Examiner—Danita R. Byrd
Attorney, Agent, or Firm—Hill, Van Santen, Steadman & Simpson

[57] ABSTRACT

A telephone apparatus composed of a telephone set and a device for changing its angle of inclination relative to its support surface is provided. To this end, a wire shackle is pivotably seated in the floor trough of the telephone set, whereby two different positions of the telephone set relative to its supporting surface are selectable on the basis of the shaping of the wire shackle. Portions of the shackle engagable with the support surface are provided with an elastic, riffled cladding to prevent slipping of the shackle on the support surface.

6 Claims, 1 Drawing Sheet

TELEPHONE DEVICE WITH MEANS FOR CHANGING THE ANGLE OF INCLINATION

BACKGROUND OF THE INVENTION

1. Field of the Invention

The present invention comprises a telephone means composed of a telephone set and of a device for changing its angle of inclination relative to its supporting surface.

2. Description of the Prior Art

An arrangement is already known wherein a wedge-shaped lower part is employed as holding device. This lower part is dimensioned such with respect to its angle of inclination that it corresponds to the angle of inclination of the operating surface of the telephone set, so that the angle of inclination can be doubled given employment of the telephone set as a table-top set, whereas the angle of inclination of the table-top set is compensated given employment of the telephone set as a wall telephone.

SUMMARY OF THE INVENTION

An object of the present invention is to provide a further possibility for changing the angle of inclination of a telephone set with simple means.

This object is achieved in that the device is formed by a wire shackle which has two ends facing one another and at a distance from one another pivotably seated in recesses of the telephone set and in that the wire shackle is fashioned such that the telephone set can be placed into at least two different angles of inclination relative to its supporting surface. This wire shackle can be easily and quickly introduced into the recesses of the telephone set and allows the user to bring the operating surface of the telephone set facing him into the desired attitude merely by pivoting the wire shackle.

To this end, the wire shackle can be shaped essentially U-shaped in its respective region effecting the change in angle of inclination, whereby the legs and the base of this region respectively comprise different lengths. The regions can thereby be connected to one another via a web. Between the regions, this web can comprise a curvature having a large radius. By bending this web, the distance between the ends of the wire shackle engaging into the recesses of the telephone set can be changed within certain limits.

In order to increase the resistance to slipping, the regions of the wire shackle resting on the supporting surface can be provided with a cladding of elastic material, whereby the cladding can be riffled.

BRIEF DESCRIPTION OF THE DRAWINGS

The invention shall be set forth in greater detail below with reference to an exemplary embodiment. Shown are.

DESCRIPTION OF THE PREFERRED EMBODIMENTS

Figure 1:
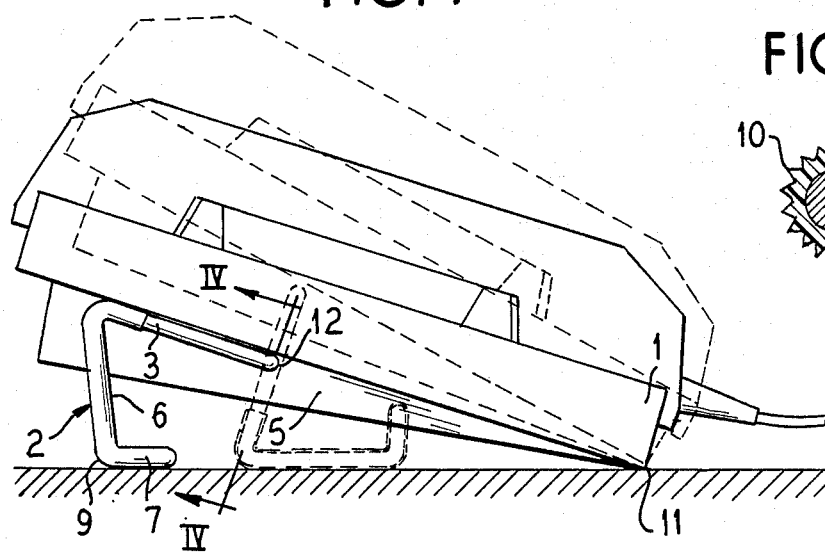
FIG. 1 is a telephone set comprising a wire shackle for changing the angle of inclination.
Figure 3:
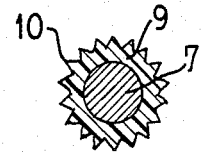
FIG. 3 is a cut side view of the wire shackle along the section line III—III.
Figure 2:
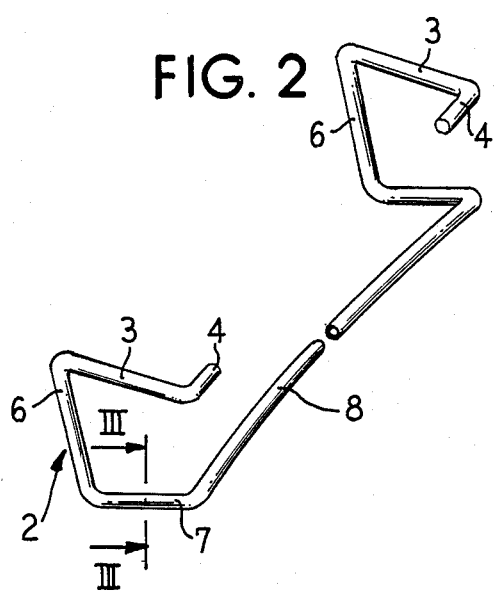
FIG. 2 is the wire shackle in a perspective view.
Figure 4:
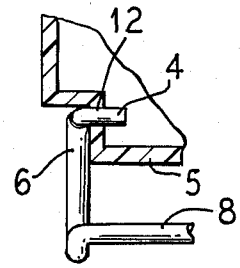
FIG. 4 is a partial sectional view of a telephone set and wire shackle taken generally along the line IV—IV of FIG. 1.

A telephone set 1 used as a table-top set should be variable with respect to its angle of inclination by means of an adjustable device.

A wire shackle 2 serves this purpose, this wire shackle 2 being bent such that two different angles of inclination of the telephone set with respect to the supporting surface accepting it can be achieved on the basis of different leg lengths. The region of the wire shackle 2 effecting the change of angle of inclination is desiged essentially U-shaped, whereby a free end 4 of a leg 3 is bent off at a right angle and is directed toward the other region fashioned U-shaped. This end 4 engages into a recess 12 in a floor trough 5 of the telephone set 1. A quick mounting as well as an easy pivoting of the wire shackle for changing the angle of inclination are thereby possible. A base 6 of the region adjacent to the leg 3 is kept somewhat smaller with respect to its length than the leg 3, whereas a leg 7 in turn connecting to the base 6 is even shorter than the base 6. The other region of the wire shackle (not shown here) effecting the change in angle of inclination is fashioned in the same way as the illustrated region and is integrally connected thereto via a web 8. The web 8 is thereby bent with a large radius in order to compensate tolerances which can occur between the angled ends of the wire shackle 2 which are hooked into the floor trough 5. In order to increase the resistance to slipping, the wire shackle is provided with a cladding 9 in the seating region. This cladding preferably composed of rubber comprises a longitudinal riffling 10.

In the exemplary embodiment shown in FIG. 1, a first position of the telephone set relative to its supporting surface 11 is shown with solid lines, whereas a second position having a greater angle of inclination relative to the supporting surface is shown with broken lines.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A telephone means to be supported on a supporting surface comprising a telephone set and a device for changing the angle of inclination thereof relative to the supporting surface, said telephone set having one end supported by said supporting surface and a second end supported by said device, said device being formed by a wire shackle having two ends directed toward one another and at a distance from one another pivotably seated in recesses of the telephone set, said wire shackle formed with at least two different portions selectively engageable with said supporting surface, the wire shackle has a U-shaped region comprising a pair of legs and a base respectively comprising three different lengths, said base and one of said legs comprising said portions engageable with said supporting surface such that the telephone set can be set into at least two different angles of inclination with respect to the supporting surface.

2. A telephone means according to claim 1, wherein a plurality of said U-shaped regions are connected to one another via a web.

3. A telephone means according to claim 2, wherein the web includes a curvature having a large radius between said regions.

4. A telephone means according to claim 1, wherein said portions of the wire shackle which rest on the supporting surface are provided with a cladding of elastic material.

5. A telephone means according to claim 4, wherein the cladding is riffled.

6. A telephone means comprising:
   a telephone set;
   a device for changing the angle of inclination of said telephone set relative to a supporting surface; said telephone set having one end supported by said supporting surface and a second end supported by said device,
   said device being formed by a wire shackle having two ends directed toward one another and at a distance from one another pivotally seated in recesses of said telephone set;
   said wire shackle being formed U-shaped in a pair of regions, each of said regions including a pair of legs and a base respectively comprising three different lengths, said base and at least one of said legs being selectively engageable with said supporting surface such that said telephone set can be set into at least two different angles of inclination with respect to said supporting surface;
   a web connecting said regions, said web having a large radius of curvature between said regions; and
   a cladding of elastic material covering portions of said shackle which rest on said supporting surface.

* * * * *